(12) United States Patent
Susanto et al.

(10) Patent No.: US 8,259,407 B1
(45) Date of Patent: *Sep. 4, 2012

(54) SPEED CONTROL SYSTEMS AND METHODS FOR DECREASING POWER CONSUMPTION IN ROTATING STORAGE DEVICES

(75) Inventors: Edy Susanto, Singapore (SG); Foo Leng Leong, Singapore (SG); Cheng Yong Teoh, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,333

(22) Filed: Jul. 25, 2011

Related U.S. Application Data

(63) Continuation of application No. 12/257,885, filed on Oct. 24, 2008, now Pat. No. 7,986,483.

(60) Provisional application No. 60/986,101, filed on Nov. 7, 2007.

(51) Int. Cl.
*G11B 19/26* (2006.01)
(52) U.S. Cl. .................................. 360/73.03
(58) Field of Classification Search ............ None
See application file for complete search history.

(56) References Cited

U.S. PATENT DOCUMENTS

| | | |
|---|---|---|
| 5,412,519 A | 5/1995 | Buettner et al. |
| 5,521,896 A | 5/1996 | Bajorek et al. |
| 5,544,138 A | 8/1996 | Bajorek et al. |
| 5,787,292 A | 7/1998 | Ottesen et al. |
| 5,907,713 A | 5/1999 | Chen et al. |
| 6,052,791 A | 4/2000 | Chen et al. |
| 6,097,679 A | 8/2000 | Ohtaki |
| 6,285,521 B1 | 9/2001 | Hussein |
| 6,512,652 B1 | 1/2003 | Nelson et al. |
| 6,611,658 B1 | 8/2003 | Takahashi |
| 6,628,470 B1 | 9/2003 | Fujimori |
| 6,717,763 B2 | 4/2004 | Ottesen et al. |
| 2003/0156345 A1 | 8/2003 | Fayeulle et al. |

OTHER PUBLICATIONS

Dr. Jim Wong; "Technology Innovation for Eco-Friendly HDDs"; Hitachi Global Storage Technologies; Oct. 2007; 4 pages.

*Primary Examiner* — Hoa T Nguyen
*Assistant Examiner* — James L Habermehl (57) ABSTRACT

A system for controlling a rotational speed of a platter in a storage device. The system includes a mode selection module configured to select a mode operation for the storage device, in which the mode of operation includes at least i) a read/write mode in which data is to be read from or written to the platter, ii) a standby mode during in which data is not to be read from or written to the platter, or iii) a shutdown mode. The system further includes a speed control module configured to control the rotational speed of the platter based on the selected mode of operation for the storage device.

13 Claims, 5 Drawing Sheets

SPEED CONTROL SYSTEMS AND METHODS FOR DECREASING POWER CONSUMPTION IN ROTATING STORAGE DEVICES

CROSS-REFERENCE TO RELATED APPLICATIONS

This present disclosure is a continuation of U.S. application Ser. No. 12/257,885, filed Oct. 24, 2008, which claims the benefit of U.S. Provisional Application No, 60/986,101, filed on Nov. 7, 2007.

FIELD

The present disclosure relates to rotating storage devices and more particularly to speed control systems for rotating storage devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Rotating storage devices include optical disc drives and hard disk drives. Both optical disc drives and hard disk drives generally include a spindle motor that rotates an optical disk or one or more platters, respectively, to a relatively constant operating speed for reading and/or writing. When operating, the spindle motors tend to consume relatively high power. Since rotating storage devices may be included in portable computing devices, power consumption of the rotating storage device may be a relatively important performance consideration.

Conventional rotating storage devices tend to operate in two modes. When in an operating mode, the spindle motor maintains the speed of the optical disc or platter at a predetermined speed. When shut down, the optical disc or platter is not rotated. Additional performance considerations of rotating storage devices include latency when accessing data. When attempting to read or write data to the rotating storage device that is shut down, the spindle motor must spin up the optical disc or platter, regulate the speed, and then initiate read or write access. These operations delay reading and/or writing operations.

SUMMARY

A speed control system for a rotating storage device comprises a mode selection module and a speed selection module. The mode selection module selects one of an operating mode and a standby mode of the rotating storage device based on use of the rotating storage device. The speed control module selects a predetermined operating speed when the operating mode is selected and selects a predetermined standby speed that is less than the predetermined operating speed and greater than zero when the standby mode is selected.

In other features, the mode selection module selects the standby mode after a first predetermined period during which reading and writing to the rotating storage device is not performed.

In further features, the mode selection module further includes a shutdown mode. The mode selection module selects the shutdown mode after a second predetermined period during which reading and writing to the rotating storage device is not performed. The second predetermined period is greater than the first predetermined period, and a shutdown speed is equal to zero.

In other features, the mode control module transitions from the standby mode to the operating mode when at least one of a read command and a write command for the HDD is received.

In further features, the speed control system further comprises a speed monitoring module. The speed monitoring module determines a speed of the rotating storage device based on back electromotive force (bemf) of a spindle motor that rotates the rotating storage device.

A hard disk drive (HDD) comprises the speed control system and a spindle motor. The spindle motor rotates a platter of the HDD.

An optical disc drive comprises the speed control system and a spindle motor. The spindle motor rotates an optical disc of the optical disc drive.

A method for a rotating storage device comprises: selecting one of an operating mode and a standby mode of the rotating storage device based on use of the rotating storage device; controlling a speed of the rotating storage device based on a predetermined operating speed when the operating mode is selected; and controlling the speed based on a predetermined standby speed that is less than the predetermined operating speed and greater than zero when the standby mode is selected.

In other features, the method further comprises selecting the standby mode after a first predetermined period during which reading and writing to the rotating storage device is not performed.

In further features, the method further comprises selecting a shutdown mode after a second predetermined period during which reading and writing to the rotating storage device is not performed. The second predetermined period is greater than the first predetermined period, and a shutdown speed is equal to zero.

In other features, the method further comprises transitioning from selecting the standby mode to selecting the operating mode when at least one of a read command and a write command for the HDD is received.

In still other features, the method further comprises determining the speed of the rotating storage device based on back electromotive force (bemf) of a spindle motor that rotates the rotating storage device.

In further features, the method further comprises controlling a platter of a hard disk drive (HDD) based on the predetermined operating speed when the operating mode is selected and controlling the platter based on the predetermined standby speed when the standby mode is selected.

In other features, the method further comprises controlling an optical disc of an optical disc drive based on the predetermined operating speed when the operating mode is selected and controlling the optical disc based on the predetermined standby speed when the standby mode is selected.

A speed control system for a rotating storage device comprises selecting means for selecting one of an operating mode and a standby mode of the rotating storage device based on use of the rotating storage device and controlling means for controlling a speed of the rotating storage device based on a predetermined operating speed when the operating mode is selected and for controlling the speed based on a predetermined standby speed that is less than the predetermined operating speed and greater than zero when the standby mode is selected.

In other features, the selecting means selects the standby mode after a first predetermined period during which reading and writing to the rotating storage device is not performed.

In further features, the selecting means selects a shutdown mode after a second predetermined period during which reading and writing to the rotating storage device is not performed. The second predetermined period is greater than the first predetermined period, and a shutdown speed is equal to zero.

In other features, the speed control system further comprises transitioning means for transitioning from selecting the standby mode to selecting the operating mode when at least one of a read command and a write command for the HDD is received.

In still other features, the speed control system further comprises determining means for determining the speed of the rotating storage device based on back electromotive force (bemf) of a spindle motor that rotates the rotating storage device.

In further features, the controlling means controls a platter of a hard disk drive (HDD) based on the predetermined operating speed when the operating mode is selected and controlling the platter based on the predetermined standby speed when the standby mode is selected.

In other features, the controlling means controls an optical disc of an optical disc drive based on the predetermined operating speed when the operating mode is selected and controlling the optical disc based on the predetermined standby speed when the standby mode is selected.

In still other features, the systems and methods described above are implemented by a computer program executed by one or more processors. The computer program can reside on a computer readable medium such as but not limited to memory, nonvolatile data storage, and/or other suitable tangible storage mediums.

The computer program comprises selecting one of an operating mode and a standby mode of the rotating storage device based on use of the rotating storage device, controlling a speed of a rotating storage device based on a predetermined operating speed when the operating mode is selected, and controlling the speed based on a predetermined standby speed that is less than the predetermined operating speed and greater than zero when the standby mode is selected.

In further features, the computer program further comprises selecting the standby mode after a first predetermined period during which reading and writing to the rotating storage device is not performed.

In still further features, the computer program further comprises selecting a shutdown mode after a second predetermined period during which reading and writing to the rotating storage device is not performed. The second predetermined period is greater than the first predetermined period, and a shutdown speed is equal to zero.

In other features, the computer program further comprises transitioning from selecting the standby mode to selecting the operating mode when at least one of a read command and a write command for the HDD is received.

In further features, the computer program further comprises determining the speed of the rotating storage device based on back electromotive force (bemf) of a spindle motor that rotates the rotating storage device.

In other features, the computer program further comprises controlling a platter of a hard disk drive (HDD) based on the predetermined operating speed when the operating mode is selected and controlling the platter based on the predetermined standby speed when the standby mode is selected.

In still other features, the computer program further comprises controlling an optical disc of an optical disc drive based on the predetermined operating speed when the operating mode is selected and controlling the optical disc based on the predetermined standby speed when the standby mode is selected.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its disclosure, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to, is part of, or includes an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

The present disclosure relates to rotating storage devices such as optical disc drives and hard disk drives. While the present disclosure is described in conjunction with a hard disk drive, the present disclosure also applies to optical disc drives.

The rotational speed of a platter of a hard disk drive (HDD) is controlled at a predetermined operating speed during reading data from and/or writing data to the platter. While one platter is described herein, the HDD may include two or more platters. Maintaining the speed of the platter at the predetermined operating speed consumes power. In some circumstances, the speed may be maintained at the predetermined operating speed during periods when data is not written to or read from the platter. This generally done to minimize latency that would otherwise occur when spinning up the platter to the predetermined operating speed. Conventional HDDs typically shut down after a predetermined period of inactivity. Once shut down, the platter needs to spin up from rest before reading or writing can occur.

A HDD speed control system according to the principles of the present disclosure controls the speed of the platter at the predetermined operating speed when reading or writing data. After a predetermined standby period during which there is no activity, the HDD speed control system reduces the speed to a predetermined standby speed. In some implementations, after a predetermined shutdown period, the HDD speed control system may shut down the spindle motor. The predetermined standby speed is less than the predetermined operating speed and greater than zero. Controlling the speed at the predetermined standby speed reduces power consumption while reducing latency when returning to the operating mode.

Figure 1:
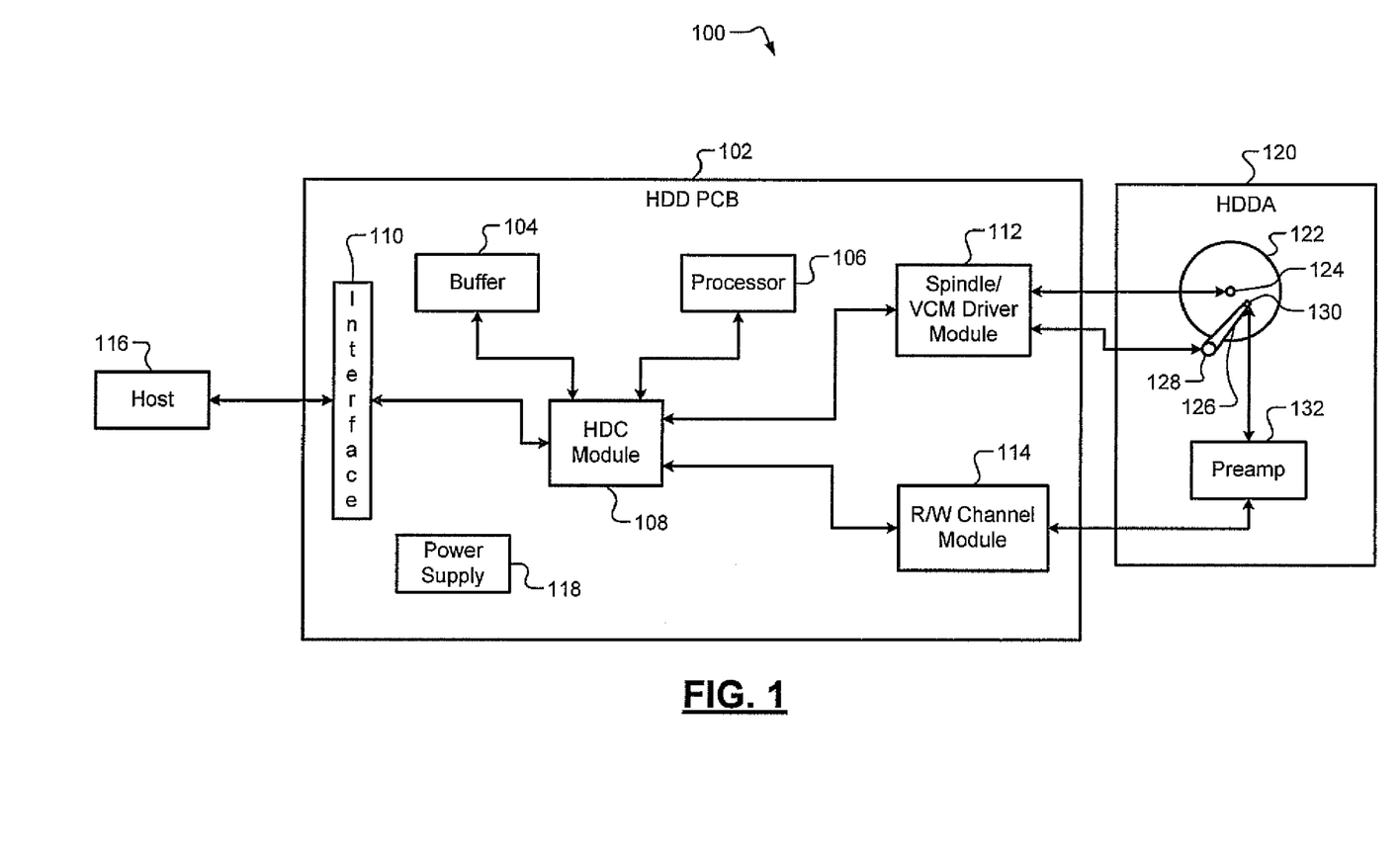
FIG. 1 is a functional block diagram of an exemplary rotating storage device according to the present disclosure.

Referring now to FIG. 1, an exemplary hard disk drive (HDD) system 100 includes a HDD printed circuit board (PCB) 102. A memory module such as buffer 104 stores read, write, and/or volatile control data that is associated the control of the HDD system 100. The buffer 104 usually employs volatile memory having low latency. For example, SDRAM, double data rate (DDR) SDRAM, or other types of low latency memory may be used. Nonvolatile memory such as flash memory may also be provided to store critical data such as nonvolatile control code.

A processor 106 arranged on the HDD PCB 102 performs data and/or control processing that is related to the operation of the HDD system 100. A hard disk control (HDC) module 108 communicates with an input/output interface 110, a spindle/voice coil motor (VCM) driver or module 112, and/or a read/write channel module 114. The HDC module 108 coordinates control of the spindle/VCM module 112, the read/write channel module 114, the processor 106, and data input/output with a host 116 via the interface 110. The HDD PCB 102 also includes a power supply 118 that supplies power for the HDD PCB 102. The power supply 118 may also supply power for a hard disk drive assembly (HDDA) 120.

The HDDA 120 includes one or more hard drive platters 122 that include magnetic coatings that store magnetic fields. The platters 122 are rotated by a spindle motor that is schematically shown at 124. Generally, the spindle motor 124 rotates the platters 122 at a predetermined speed during the read/write operations. The spindle/VCM module 112 controls the spindle motor 124 and, therefore, rotational speed of the platters 122.

One or more read/write arms 126 move relative to the platters 122 to read data from the platters 122 and/or write data to the platters 122. The spindle/VCM module 112 controls an arm actuator 128, which controls the position the read/write arm 126. For example, the arm actuator 128 may include a voice coil actuator, a stepper motor or any other suitable actuator.

A read/write device 130 is located near a distal end of the read/write arm 126. The read/write device 130 includes a write element such as an inductor that generates a magnetic field. The magnetic field alters the magnetic composition of the magnetic coating of the platters 122. In this manner, the read/write device 130 stores data on the platters 122. The read/write device 130 also includes a read element (such as a magneto-resistive (MR) element). The read element senses the magnetic field on the platters 122.

During write operations, the read/write channel module 114 encodes data that is to be written with the read/write device 130. The read/write channel module 114 processes the write signal for reliability and may apply, for example, error correction coding (ECC), run length limited coding (RLL), and the like.

During read operations, the read/write channel module 114 converts an analog read signal that is output by the read/write device 130 into a digital read signal. The digital read signal is then detected and decoded by known techniques to recover the data that was written on the platters 122. The data can then be sent to the host 116 via the interface 110.

Portions of the HDD system 100 may be implemented by one or more integrated circuits (IC) or chips. For example, the processor 106 and the HDC module 108 may be implemented by a single chip. The spindle/VCM module 112 and/or the read/write channel module 114 may also be implemented by the same chip as the processor 106, the HDC module 108 and/or by additional chips. Alternatively, most of the HDD system 100 other than the HDDA 120 may be implemented as a system on chip (SOC).

The HDDA 120 includes a preamplifier circuit or module 132 that amplifies the analog read/write signals. When reading data, the preamplifier 132 amplifies low level signals from the read element of the read/write device 130 and outputs the amplified signal to the read/write channel module 114. When writing data, the preamplifier 132 generates a write current that flows through the write element of the read/write device 130. The write current is switched to produce a magnetic field having a positive or negative polarity. The positive or negative polarity is stored on one or more of the platters 122 and is used to represent data.

The host 116 transmits data to the HDC module 108 and receives data from the HDC module 108 via the interface 110. For example, the host 116 transmits write data to be written to a hard disk drive assembly (HDDA) 120 to the HDC module 108. The HDC module 108 transmits data read from the HDDA 120 to the host 116.

The HDC module 108 also receives commands for the HDDA 120 via the interface 110. For example only, the commands may include read commands, write commands, shutdown commands, and other suitable commands. The HDC module 108 controls the HDDA 120 based on received commands. More specifically, the HDC module 108 coordinates operation of various components of the HDDA 120 when writing data to the platters 122 and/or reading data from the platters 122.

The HDC module 108 transmits data to be written to the read/write channel module 114 which encodes the data. The read/write channel module 114 transmits the encoded data to the preamplifier 132. The preamplifier 132 provides signals to the write element of the read/write device 130, which writes the data to the platters 122.

The HDC module 108 also controls operation of the spindle/VCM module 112 when the write command is received. For example, the HDC module 108 transmits commands to the spindle/VCM module 112 for the write command. The spindle/VCM module 112 controls the arm actuator 128 based on the commands, which positions the read/write arm 126 accordingly.

The HDC module 108 also coordinates control of the spindle motor 124. The spindle/VCM module 112 controls the spindle motor 124 and, therefore, the rotational speed of the platters 122 based on commands received from the HDC module 108. The spindle/VCM module 112 generally controls the speed of the platters 122 based on a predetermined operating speed during read/write operations. For example only, the predetermined operating speed may be set to 3600, 7200, or 15000 revolutions per minute (rpm), although other speeds may be used.

In some circumstances, the host 116 may transmit a shutdown command to the HDC module 108 for the HDDA 120. For example only, the host 116 may transmit the shutdown command when a user initiates a shutdown of the device in which the HDD system 100 is implemented. The HDD may also decide to shutdown based on inactivity.

The HDC module 108 commands the spindle/VCM module 112 to shutdown the HDDA 120 when the shutdown command is received. In various implementations, the spindle/VCM module 112 may actively reduce the platter speed. For example, the spindle/VCM module 112 may supply a signal to the spindle motor 124 to accomplish braking and then remove the signal when the speed is zero. In other implementations, the spindle/VCM module 112 disables the flow of power to the spindle motor 124 when the shutdown command is received. Disabling the flow of power allows friction to naturally decrease the platter speed. When a read and/or write command is received after the HDDA 120 is shutdown, the HDC module 108 commands the spindle/VCM module 112 to increase the speed of the platters 122 to the predetermined operating speed.

In some systems, the spindle/VCM module 112 maintains the platter speed at the predetermined operating speed despite inactivity for a predetermined period without reading data from or writing data to the platters 122. This approach improves latency at the expense of power consumption.

The speed control system according to the present disclosure controls the speed of the platters 122 based on a predetermined standby speed. For example only, the speed may be reduced from the predetermined operating speed to the predetermined standby speed when inactivity occurs for a predetermined period. In other words, the HDD speed control system controls the platter speed based on the predetermined standby speed when inactivity occurs for the first predetermined period. The predetermined standby speed may be set to a speed that is less than the predetermined operating speed and greater than 0 rpm. For example only, the predetermined standby speed may be set to approximately 500 rpm.

In some implementations, the predetermined standby speed is at least 10% less than the predetermined operating speed. In other implementations, the predetermined standby speed is at least 20% less than the predetermined operating speed. In still other implementations, the predetermined standby speed is at least 30% less than the predetermined operating speed.

For example only, the predetermined operating speed may be set to 7200 rpm and the predetermined standby speed may be set to 5400 rpm. Still other speeds may be used.

Figure 2A:
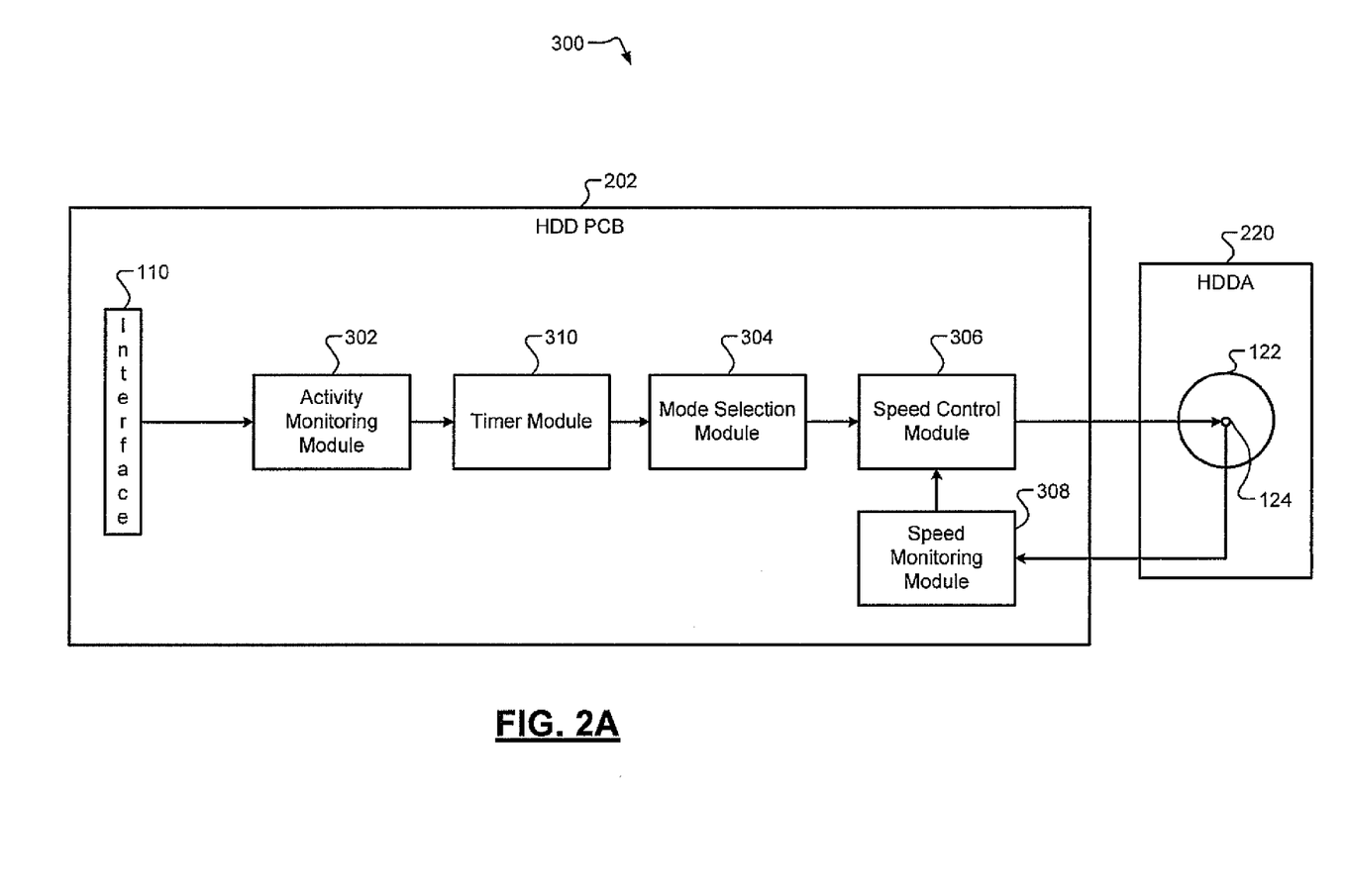
FIGS. 2A-2B are functional block diagrams of exemplary HDD speed control systems according to the present disclosure.
Figure 2B:
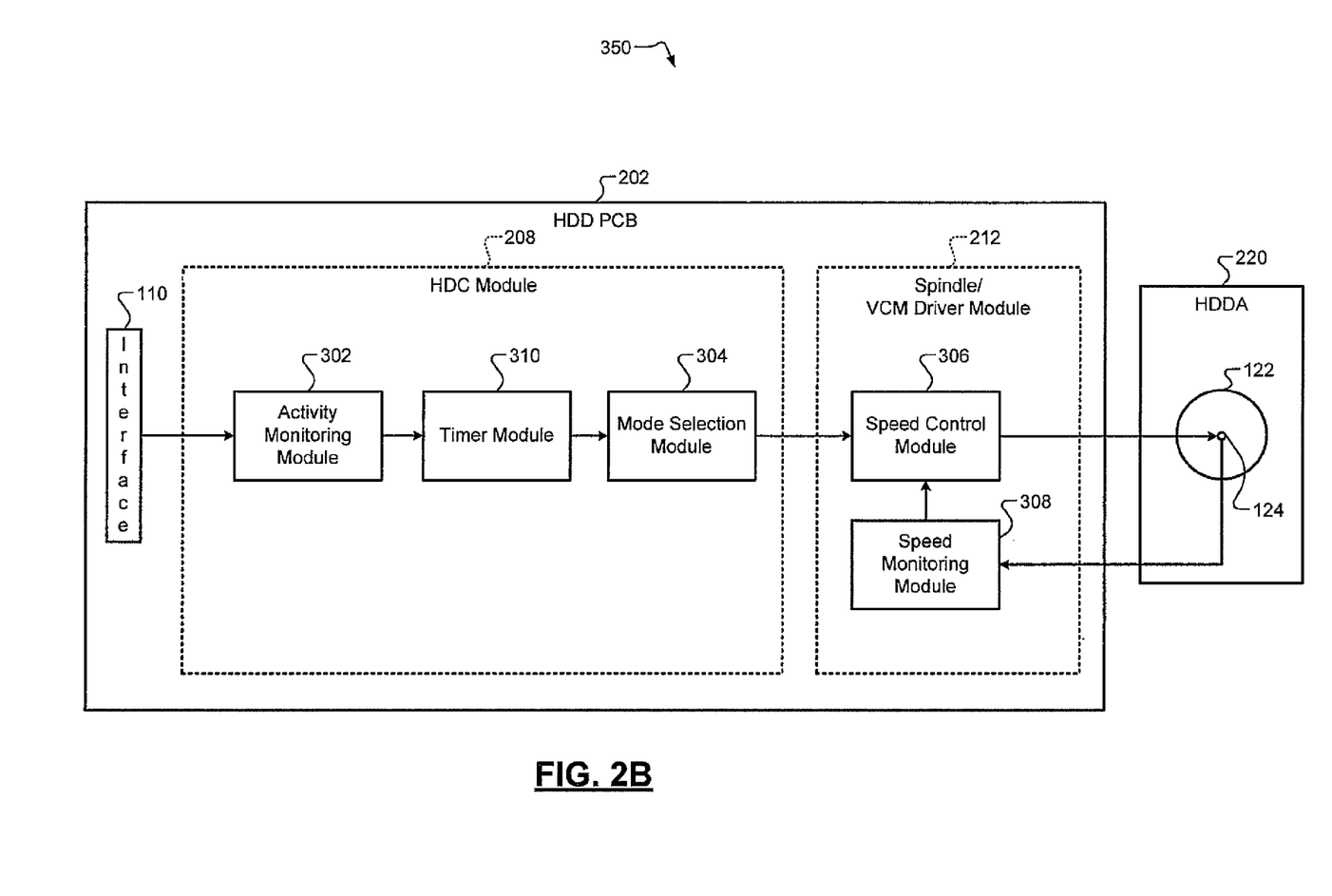

Referring now to FIGS. 2A and 2B, a functional block diagram of an exemplary HDD speed control system 300 is presented. The HDD speed control system 300 may include a monitoring module 302, a mode selection module 304, a speed control module 306, and a speed monitoring module 308. The HDD speed control system 300 also includes a timer module 310. The timer module 310 may be implemented in any suitable manner, such as in memory.

The monitoring module 302 monitors commands received from the host 116, another device, or another module of the HDD. For example only, the monitoring module 302 may indicate when at least one of a read command and a write command is received from the host. The monitoring module 302 may also indicate when a shutdown command is received from the host 116. The command can be received from, for example, a user of a device comprising the HDD, the host 116, another module of the HDD, and/or any other suitable source.

The timer module 310 determines time elapsed since a read command, a write command, or other commands have occurred. For example only, the timer module 310 may determine the amount of time since data was at least one of written to or read from the platters 122. The timer module 310 may be reset when the monitoring module 302 indicates that a command has been received.

The HDDA 120 operates in a read/write mode, a standby mode, or a shutdown mode. The mode selection module 304 selects one of the modes while disabling the other modes of operation of the HDDA 120.

The mode selection module 304 selects one of the read/write mode and the standby mode based on the period of time indicated by the timer module 310. More specifically, the mode selection module 304 selects the standby mode when the period of time indicated by the timer module 310 is greater than the predetermined standby period. If not, the mode selection module selects the read/write mode of the HDDA 120. In some implementations, the mode selection module 304 selects the shutdown mode when the period of time indicated by the timer module 310 is greater than the predetermined shutdown period.

The predetermined standby period may be set based on a variety of characteristics, such as the device in which the HDDA 120 is implemented, desired power savings, and/or any other suitable characteristics. For example only, the predetermined standby period may be shorter if increased power savings is desired.

The speed control module 306 controls the rotational speed of the platters 122 via the spindle motor 124. The speed control module 306 controls the platter speed based on the selected mode of operation.

The speed monitoring module 308 monitors the rotational speed of the platters 122 and provides the platter speed to the speed control module 306. In this manner, the speed monitoring module 308 provides the speed control module 306 with feedback regarding the actual platter speed, which the speed control module 306 uses in controlling the platter speed. The speed monitoring module 306 may monitor the speed of the platters 122 in any suitable manner. For example only, the speed monitoring module 308 may determine the speed of the platters 122 based on back electromotive force (back emf) of the spindle motor 124.

One or more modules of the HDD speed control system 300 may be implemented within one or more of the modules of the HDD system 100, such as is shown in an exemplary HDD speed control system 350 of FIG. 3B. For example only, the activity monitoring module 302, the mode selection module 304, and the timer module 310 may be implemented within the HDC module 108. The speed control module 306 and the speed monitoring module 308 may be implemented within the spindle/VCM module 112.

Figure 3:
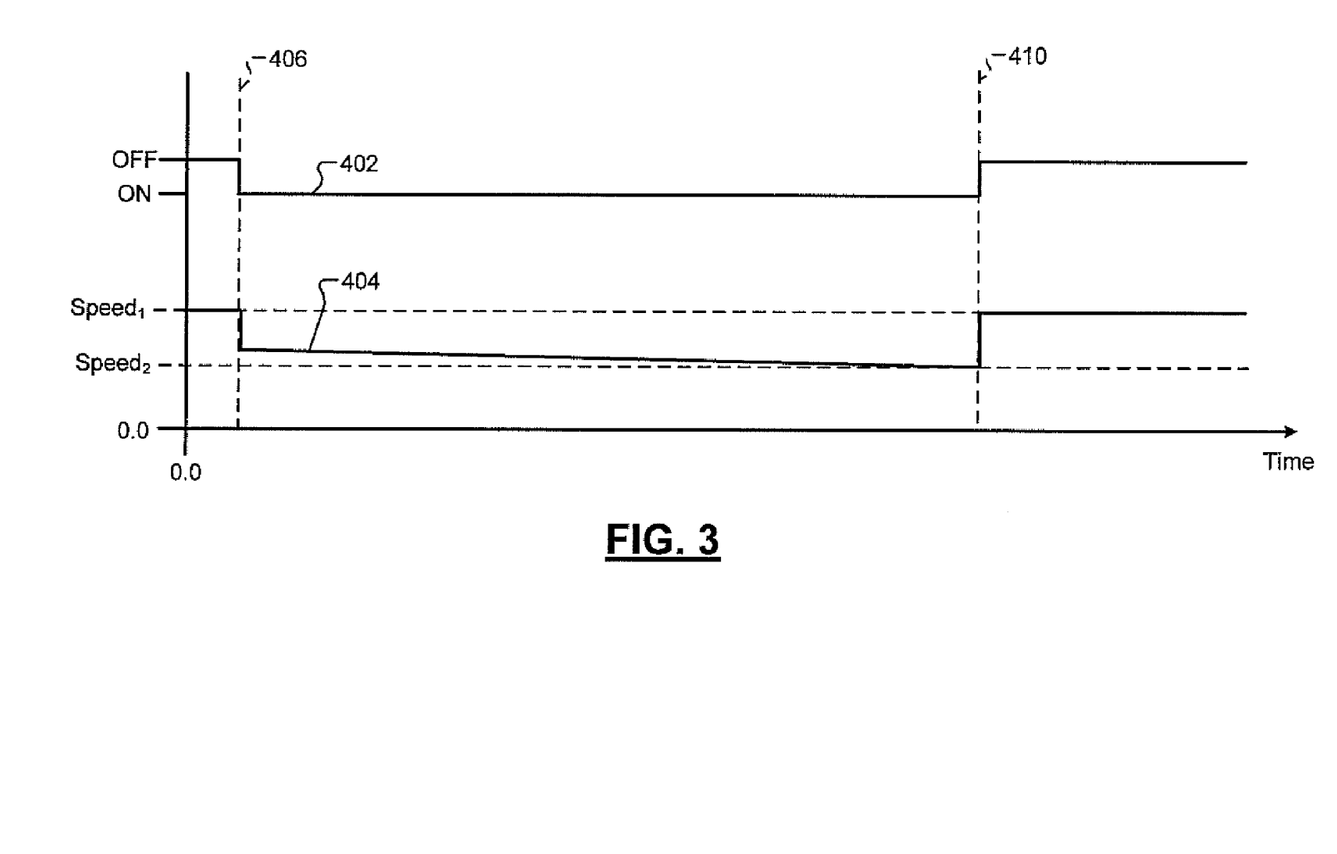
FIG. 3 is an illustration of operation of HDD speed control systems according to the present disclosure.

Referring now to FIG. 3, operation of the HDD speed control system 300 is illustrated. Line 402 corresponds to whether the standby mode of the HDDA 120 is selected (i.e., ON). Line 404 corresponds to the rotational speed of the platters 122 of the HDDA 120. The speed control module 306 controls the speed of the platters 122 based on the selected mode of operation.

At time zero, the mode selection module 304 selects the read/write mode of operation and the standby mode is not selected (i.e., OFF). The speed control module 306 controls the speed of the platters 122 based on the predetermined operating speed (Speed1). At time 406, however, the mode selection module 304 selects the standby mode as shown by line 402.

The mode selection module 304 selects the standby mode when the predetermined standby period has elapsed without activity. For example only, the mode selection module 304 selects the standby mode when data has not been written to or read from the platters 122 for the predetermined standby period.

When the standby mode is selected, the speed control module 306 controls the platter speed based on the predetermined standby speed (Speed2). The predetermined standby speed is less than the predetermined operating speed and is greater than 0 rpm. The speed control module 306 decreases the platter speed toward the predetermined standby speed as shown by line 404 between times 406 and 410. The speed control module 306 may decrease the speed of the platters 122 in any suitable manner. For example, the speed control module 306 may disable the supply of power to the spindle motor 124 and allow the inertia of the platters 122 to naturally decrease the platter speed.

While the platter speed is decreasing toward the predetermined standby speed, the standby mode can be de-selected. For example, the mode selection module 304 can de-select the standby mode and select the read/write mode or the shutdown mode when a read/write command or a shutdown command is received, respectively.

A read command and/or a write command is received at time 410. Accordingly, the mode selection module 304 selects the read/write mode and deselects the standby mode at time 410, as shown by line 402. The speed control module 306 then increases the platter speed as shown by line 404 and controls the platter speed based on the predetermined operating speed.

Figure 4:
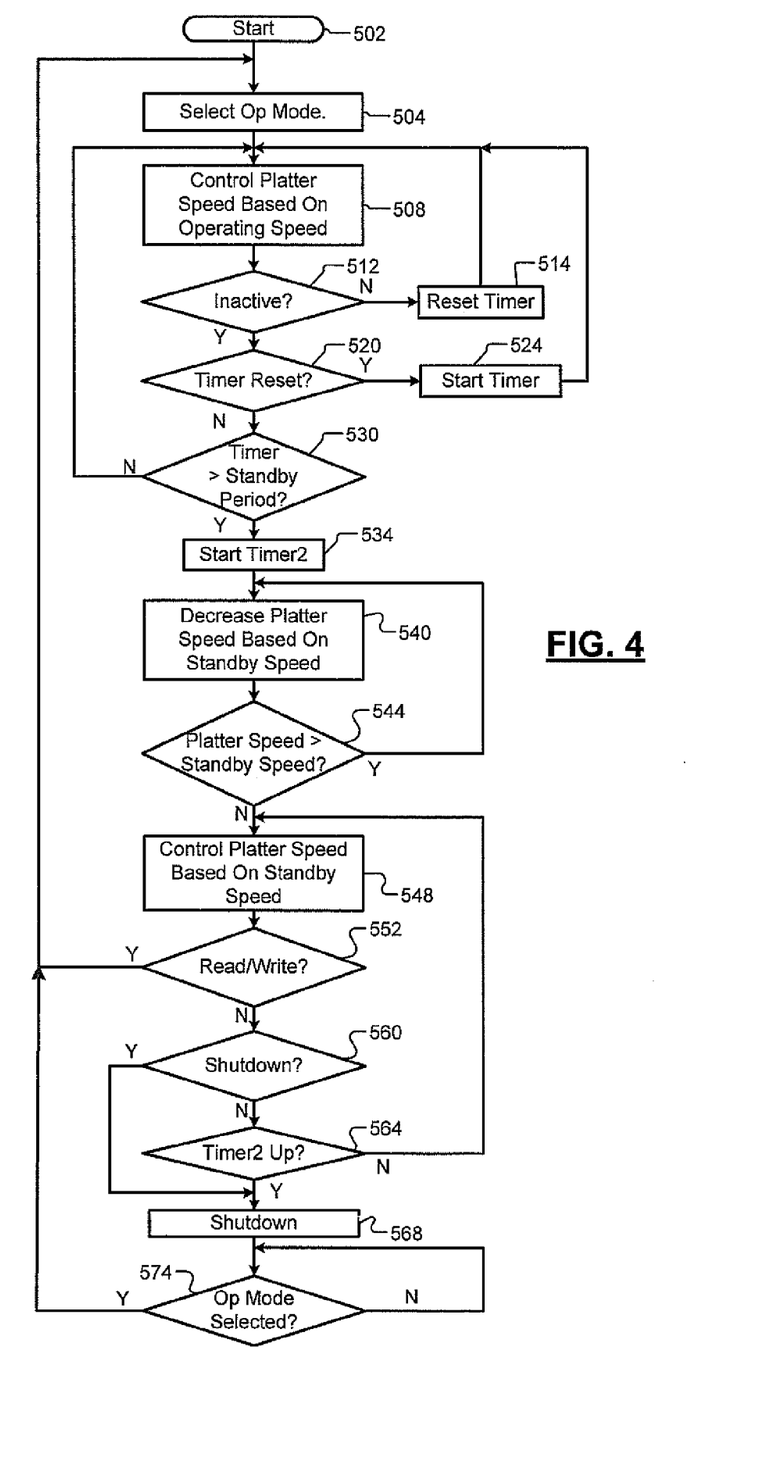
FIG. 4 is a flowchart depicting exemplary steps performed by HDD speed control systems according to the present disclosure.

Referring now to FIG. 4, a flowchart depicting exemplary steps performed by the speed control system of the present disclosure is presented. Control begins with step 502. In step 504, control selects the operating mode. In step 508, control sets the platter speed based on the operating speed.

In step 512, control determines whether the rotating storage device is inactive. If step 512 is false, control resets the timer and continues with step 508. If step 512 is true, control determines in step 520 whether the timer is in a reset state. If step 520 is true, control starts the timer in step 524 and control returns to step 508. If step 520 is false and the timer is not in a reset state (or counting the inactivity), control determines whether the timer is greater than a standby period in step 530. If step 530 is false, control returns to step 508. If step 530 is true, control starts a second timer in step 534.

In step 540, control decreases platter speed based on the standby speed. In step 544, control determines whether the platter speed is greater than the standby speed. If step 544 is true, control returns to step 540. If step 544 is false, control continues with step 548 and controls the platter speed based on the standby speed.

In step 552, control determines whether there is a read or write request. If step 552 is true, control returns to step 504. If step 552 is false, control determines whether a shutdown request has been made. If step 560 is false, control continues with step 564 and determines whether the second timer is up. If steps 560 or 564 are true, control continues with step 568 and shuts down the rotating storage device.

In step 574, control determines whether the rotating storage device should return to the operating mode. This may occur for various reasons such as a host request, a read/write request, and/or any other suitable purpose. Control waits if step 574 is false. If step 574 is true, control returns to step 504.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system for controlling a rotational speed of a platter in a storage device, the system comprising:
a mode selection module configured to select a mode of operation for the storage device, wherein the mode of operation includes i) a read/write mode in which data is to be read from or written to the platter, ii) a standby mode in which data is not to be read from or written to the platter, or iii) a shutdown mode, wherein the mode selection module is configured to select the standby mode after a predetermined period during which reading and writing to the storage device is not performed, and wherein the predetermined period is selected based on a type of device in which the storage device is implemented; and
a speed control module configured to
in response to the mode selection module selecting the read/write mode of operation for the storage device, maintain the rotational speed of the platter at a first predetermined speed to permit reading or writing of data to the platter,
in response to the mode selection module selecting the shutdown mode of operation for the storage device, reduce the rotational speed of the platter to rest, and
in response to the mode selection module selecting the standby mode of operation for the storage device, maintain the rotational speed of the platter at a second predetermined speed that is i) less than the first predetermined speed, and ii) greater than rest.

2. The system of claim 1, further comprising:
a timer module configured to determine an amount of time that has elapsed since data has been read from or written to the platter,
wherein the mode selection module configured to select the mode operation for the storage device based on the amount of time that has elapsed since data has been read from or written to the platter.

3. The system of claim 1, further comprising:
a spindle motor configured to rotate the platter, wherein the spindle motor is controlled by the speed control module.

4. The system of claim 1, wherein the platter comprises an optical disk.

5. A storage device comprising the system of claim 1.

6. The storage device of claim 5, wherein the storage device comprises an optical disk drive.

7. The storage device of claim 5, wherein the storage device comprises an hard disk drive.

8. A method for controlling a rotational speed of a platter in a storage device, the method comprising:
selecting a mode of operation for the storage device, wherein the mode of operation includes i) a read/write mode in which data is to be read from or written to the platter, ii) a standby mode in which data is not to be read from or written to the platter, or iii) a shutdown mode; and
selecting the standby mode after a predetermined period during which reading and writing to the storage device is not performed, wherein the predetermined period is selected based on a type of device in which the storage device is implemented, and
wherein
in response to the read/write mode of operation for the storage device being selected, maintaining the rotational speed of the platter at a first predetermined speed to permit reading or writing of data to the platter,
in response to the shutdown mode of operation for the storage device being selected, reducing the rotational speed of the platter to rest, and in response to the standby mode of operation for the storage device being selected, maintaining the rotational speed of the platter at a second predetermined speed that is i) less than the first predetermined speed, and ii) greater than rest.

9. The method of claim 8, further comprising:

determining an amount of time that has elapsed since data has been read from or written to the platter, wherein selecting the mode operation for the storage device comprises selecting the mode operation based on the amount of time that has elapsed since data has been read from or written to the platter.

10. The method of claim 8, wherein the platter comprises an optical disk.

11. A computer program for controlling a rotational speed of a platter in a storage device, wherein the computer program comprises instructions, tangibly stored on a computer readable medium, for causing a programmable processor to:

select a mode of operation for the storage device, wherein the mode of operation includes at least i) a read/write mode in which data is to be read from or written to the platter, ii) a standby mode during in which data is not to be read from or written to the platter, or iii) a shutdown mode; and select the standby mode after a predetermined period during which reading and writing to the storage device is not performed, wherein the predetermined period is selected based on a type of device in which the storage device is implemented, and wherein in response to the read/write mode of operation for the storage device being selected, maintain the rotational speed of the platter at a first predetermined speed to permit reading or writing of data to the platter, in response to the shutdown mode of operation for the storage device being selected, reduce the rotational speed of the platter to rest, and in response to the standby mode of operation for the storage device being selected, maintain the rotational speed of the platter at a second predetermined speed that is i) less than the first predetermined speed, and ii) greater than rest.

12. The computer program of claim 11, further comprising instructions for causing the programmable processor to:

determine an amount of time that has elapsed since data has been read from or written to the platter, wherein the instructions to select the mode operation for the storage device comprise instructions to select the mode operation based on the amount of time that has elapsed since data has been read from or written to the platter.

13. The computer program of claim 11, wherein the platter comprises an optical disk.

* * * * *